July 5, 1932.  S. WHITWORTH  1,865,548

BRAKE SHOE

Filed Feb. 9, 1929

INVENTOR
Stanley Whitworth
BY H. O. Clayton
ATTORNEY

Patented July 5, 1932

1,865,548

UNITED STATES PATENT OFFICE

STANLEY WHITWORTH, OF SOUTH BEND, INDIANA, ASSIGNOR TO BENDIX BRAKE COMPANY, OF SOUTH BEND, INDIANA, A CORPORATION OF ILLINOIS

BRAKE SHOE

Application filed February 9, 1929. Serial No. 338,810.

This invention relates to brakes and is illustrated as embodied in a shoe for an internal expanding automobile brake. An object of the invention is to provide a shoe built up of stampings, preferably in such a manner as to form a channel-section shoe. A further object is to provide a light and inexpensive shoe of great strength for use in a brake of this character preferably by building it up of a number of separate parts fastened together in a novel manner such that the various parts fully co-operate with each other in securing maximum strength in the finished shoe.

The above and other objects and features of the invention will be apparent from the following description of one illustrative embodiment shown in the accompanying drawing, in which.

Figure 1:
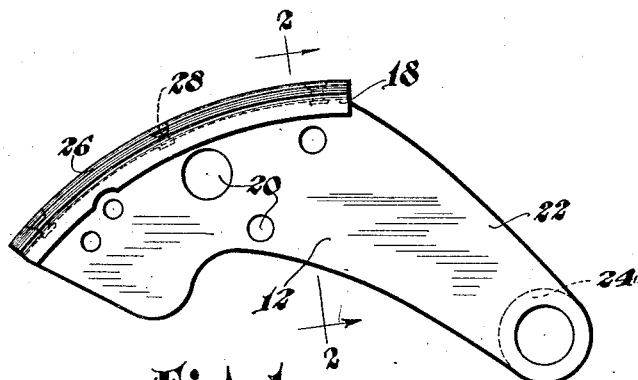
Figure 1 is a side elevation of the novel shoe.
Figure 2:
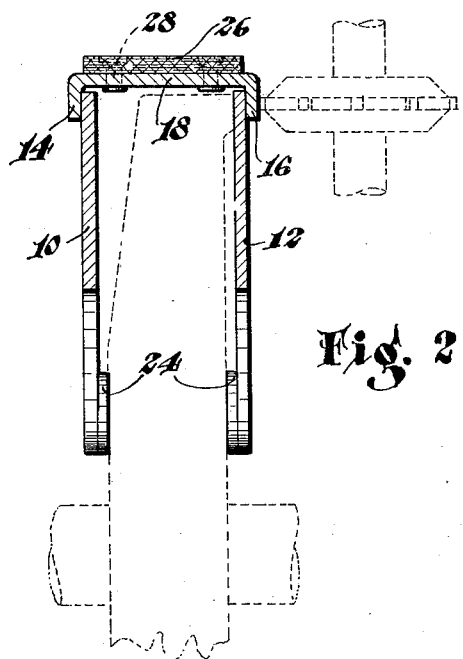
Figure 2 is a transverse section on the line 2—2 of Figure 1 looking in the direction of the arrows.

The shoe selected for illustration is preferably built up from three sections or stampings, pressed iron or sheet steel, and includes two similar radial reinforcing portions or webs 10 and 12 at opposite sides of the shoe which preferably abut the inner walls of the radially extending flanges 14 and 16 of a channel-sectioned cylindrically curved rim member 18. The web members are provided with suitable openings 20 to accommodate the necessary co-operating brake parts and are particularly characterized by their relatively long end extensions or arms 22 having aligned bushings 24 adapted to be mounted on a pivot.

The channel rim flanges 14 and 16 are preferably projection welded to the web members by means of suitable electrodes as disclosed. The rim 18 may be provided with the usual friction lining 26 secured thereto as by rivets 28 and the lining is preferably co-extensive with the length of the rim face.

A very compact brake shoe is thus provided, the channel section of the same insuring a rigid structure.

While one illustrative embodiment has been described in detail, it is not my intention to limit the scope of the invention thereto or otherwise than by the scope of the appended claims.

I claim:

1. A brake shoe comprising, a channel section of relatively shallow depth providing a rim part having a face adapted to engage a friction lining and two radially extending web parts forming the sides of the shoe, said web parts abutting and secured to the inner sides of the flanges of the channel rim.

2. A brake shoe comprising, a channel section of relatively shallow depth providing a rim part and two radially extending web parts forming the sides of the shoe said rim part only, forming a face adapted to engage a friction lining, said web parts abutting and secured to the sides of the flanges of the channel rim, the webs being further characterized by relatively long extensions at one end of the shoe forming spaced arms.

3. A brake shoe comprising, a rim of relatively shallow channel section having secured thereto along its side flanges web members extending radially of the shoe, said rim part only, forming a face adapted to engage a friction lining.

4. A brake shoe comprising a shallow channel section having a wide rim portion and relatively narrow turned up flanges, and radially extending web portions attached to said flanges, said rim having substantially the width of the entire shoe and adapted to engage a friction lining.

5. A brake shoe comprising a channel section of relatively shallow depth providing a rim part and flanges, and two radially extending web parts projection welded to said flanges, the said rim part alone forming a face adapted to engage a friction lining.

In testimony whereof, I have hereunto signed my name.

STANLEY WHITWORTH.